United States Patent

Tsunenishi et al.

(10) Patent No.: US 10,501,609 B2
(45) Date of Patent: Dec. 10, 2019

(54) HOSE RUBBER COMPOSITION AND HYDRAULIC HOSE

(71) Applicant: BRIDGESTONE CORPORATION, Tokyo (JP)

(72) Inventors: Youhei Tsunenishi, Yokohama (JP); Sho Ochiai, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 88 days.

(21) Appl. No.: 15/756,153

(22) PCT Filed: Aug. 30, 2016

(86) PCT No.: PCT/JP2016/003961
§ 371 (c)(1),
(2) Date: Feb. 28, 2018

(87) PCT Pub. No.: WO2017/047025
PCT Pub. Date: Mar. 23, 2017

(65) Prior Publication Data
US 2018/0273734 A1    Sep. 27, 2018

(30) Foreign Application Priority Data
Sep. 16, 2015 (JP) .................. 2015-183199

(51) Int. Cl.
| | |
|---|---|
| *C08L 23/16* | (2006.01) |
| *C08L 9/02* | (2006.01) |
| *C08K 3/26* | (2006.01) |
| *C08K 5/098* | (2006.01) |
| *F16L 11/08* | (2006.01) |
| *F16L 11/04* | (2006.01) |

(52) U.S. Cl.
CPC .................. *C08L 9/02* (2013.01); *C08L 23/16* (2013.01); *F16L 11/04* (2013.01); *F16L 11/085* (2013.01)

(58) Field of Classification Search
CPC ... C08L 9/02; C08L 23/16; F16L 11/04; F16L 11/085
USPC .......................................................... 524/398
See application file for complete search history.

(56) References Cited

U.S. PATENT DOCUMENTS

| | | | |
|---|---|---|---|
| 2010/0104787 A1 | 4/2010 | Gong et al. | |
| 2015/0183970 A1* | 7/2015 | Miyamoto | ............... B32B 1/08 138/138 |

FOREIGN PATENT DOCUMENTS

| | | |
|---|---|---|
| CN | 104379659 A | 2/2015 |
| JP | 2001-192505 A | 7/2001 |
| JP | 2004-262997 A | 9/2004 |

(Continued)

OTHER PUBLICATIONS

International Search Report for PCT/JP2016/003961, dated Nov. 22, 2016.

(Continued)

*Primary Examiner* — William K Cheung
(74) *Attorney, Agent, or Firm* — Sughrue Mion, PLLC

(57) ABSTRACT

Provided is a hose rubber composition having improved adhesiveness to wires while maintaining rubber characteristics, and containing: acrylonitrile-butadiene rubber (NBR) and ethylene-propylene-diene rubber (EPDM) as rubber components; and further containing: a cobalt salt of an organic acid and hydrotalcite, in which 0.5 to 5 parts by mass of the hydrotalcite is contained with respect to 100 parts by mass of the rubber components.

15 Claims, 1 Drawing Sheet

(56) References Cited

FOREIGN PATENT DOCUMENTS

| JP | 2005-188607 A | 7/2005 |
|---|---|---|
| JP | 2005-291281 A | 10/2005 |
| JP | 2008-265283 A | 11/2008 |
| JP | 2009-215674 A | 9/2009 |
| JP | 2010164063 A | 7/2010 |
| JP | 2010-248319 A | 11/2010 |
| JP | 2011-011542 A | 1/2011 |
| WO | 2008/108198 A1 | 9/2008 |
| WO | 2012/114667 A1 | 8/2012 |

OTHER PUBLICATIONS

Communication dated Jul. 9, 2018 from the European Patent Office in counterpart application No. 16845903.0.
Search Report dated Jul. 30, 2019 in Chinese Application No. 201680053341.2.

* cited by examiner

HOSE RUBBER COMPOSITION AND HYDRAULIC HOSE

This application is a National Stage of International Application No. PCT/JP2016/003961 filed Aug. 30, 2016, claiming priority based on Japanese Patent Application No. 2015-183199 filed Sep. 16, 2015.

TECHNICAL FIELD

The present disclosure relates to a hose rubber composition and a hydraulic hose.

BACKGROUND

Conventionally, a chloroprene rubber (CR)-based rubber composition has been employed for the outer cover rubber of hydraulic hoses, as the composition is well-balanced in a wide range of rubber characteristics, such as weather resistance, wear resistance, heat resistance, oil resistance, and low temperature properties, which are important factors in the outer cover rubber.

On the other hand, in recent years, environmental considerations call for an increasing demand for rubber compositions of a blend system of acrylonitrile-butadiene rubber (NBR) and ethylene-propylene-diene rubber (EPDM), without using chloroprene rubber (CR) containing chlorine, where acrylonitrile-butadiene rubber (NBR) is to develop oil resistance and ethylene-propylene-diene rubber (EPDM) is to develop weather resistance and heat resistance (see PTL 1 and PTL 2 below). In the above-mentioned blend system, sulfur, a cobalt salt of an organic acid, silica, and a resorcinol-formaldehyde (RH)-based resin are used as compounding agents for securing adhesiveness to wires.

CITATION LIST

Patent Literature

PTL 1: JP 2001-192505 A
PTL 2: WO 2008/108198 A

SUMMARY

Technical Problem

However, EPDM has few double bond sites, and thus the NBR/EPDM blend system is unstable in adhesiveness to wires.

Further, most of NBR and EPDM are produced through emulsion polymerization, and we have found that the NBR/EPDM blend system produced through emulsion polymerization is very unstable in adhesiveness to wires.

Therefore, it could be helpful to provide a hose rubber composition capable of solving the above-mentioned problems of the conventional art and having improved adhesiveness to wires while maintaining rubber characteristics.

Further, it could also be helpful to provide a hydraulic hose employing the hose rubber composition and having high durability.

Solution to Problem

We provide the followings to solve the above-mentioned problems.

The disclosed rubber composition contains: acrylonitrile-butadiene rubber (NBR) and ethylene-propylene-diene rubber (EPDM) as rubber components; and a cobalt salt of an organic acid and hydrotalcite, in which 0.5 to 5 parts by mass of the hydrotalcite is contained with respect to 100 parts by mass of the rubber components.

The hose rubber composition is improved in adhesiveness to wires while maintaining rubber characteristics.

According to a preferred example of the disclosed hose rubber composition, 1 to 5 parts by mass of the cobalt salt of an organic acid is contained with respect to 100 parts by mass of the rubber components. In this case, the adhesiveness to wires improves further, and processability of the rubber composition is also favorable.

According to another preferred example of the disclosed hose rubber composition, cobalt versatate is included as the cobalt salt of an organic acid. In this case, the adhesiveness to wires improves furthermore.

According to still another preferred example of the disclosed hose rubber composition, a mass ratio (NBR/EPDM) of the acrylonitrile-butadiene rubber (NBR) to the ethylene-propylene-diene rubber (EPDM) is 55/45 to 75/25. In this case, oil resistance and weather resistance are particularly favorable.

The hydraulic hose of the present disclosure employs the above-mentioned hose rubber composition. The above-mentioned hydraulic hose has high durability.

Advantageous Effect

The disclosed hose rubber composition has improved adhesiveness to wires while maintaining rubber characteristics.

Further, the disclosed hydraulic hose has high durability.

BRIEF DESCRIPTION OF THE DRAWING

In the accompanying drawing:
The Figure is a perspective view illustrating a laminated structure of a hydraulic hose according to an embodiment of the present disclosure employing a hose rubber composition of the present disclosure.

DETAILED DESCRIPTION

Figure 1:
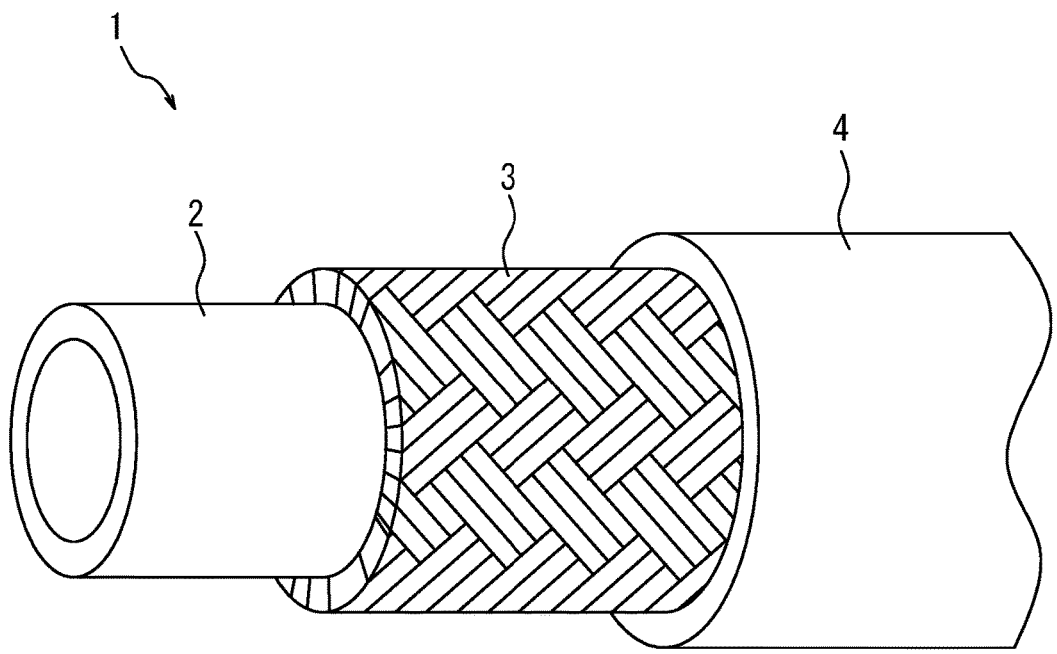

Hereinafter, the disclosed hose rubber composition and hydraulic hose will be described specifically based on embodiments.

<Hose Rubber Composition>

The disclosed hose rubber composition contains:
acrylonitrile-butadiene rubber (NBR) and ethylene-propylene-diene rubber (EPDM) as rubber components; and a cobalt salt of an organic acid and hydrotalcite, in which 0.5 to 5 parts by mass of the hydrotalcite is contained with respect to 100 parts by mass of the rubber components.

The hose rubber composition of the present disclosure contains 0.5 parts by mass or more of hydrotalcite with respect to 100 parts by mass of the rubber components, and the hydrotalcite adsorbs moisture or emulsifier component deriving from raw materials or penetrating into the rubber components during storage. The hose rubber composition containing a cobalt salt of an organic acid has high adhesiveness to wires by nature. However, a rubber composition containing a polymer produced through emulsion polymerization may be lowered in adhesiveness to wires under high moisture content, and thus, the adhesiveness to wires is influenced by the raw materials and storage conditions. On the other hand, in the disclosed hose rubber composition, hydrotalcite is considered to absorb moisture or emulsifier component. Thus, the adhesiveness to wires is high regardless of the raw materials or storage conditions, which suppresses the adhesiveness to wires from becoming unstable. Further, the disclosed hose rubber composition contains 5 parts by mass or less of the hydrotalcite with respect to 100 parts by mass of the rubber components, and thus, the hydrotalcite less affects the rubber characteristics such as Eb (elongation at break) and Tb (tensile strength).

From the above points, the disclosed hose rubber composition has improved adhesiveness to wires while maintaining rubber characteristics.

The disclosed hose rubber composition contains acrylonitrile-butadiene rubber (NBR) and ethylene-propylene-diene rubber (EPDM) as rubber components. NBR and EPDM may be modified or not modified at the molecular chain ends. Further, NBR and EPDM are preferably produced through emulsion polymerization (so as to be obtained as emulsion-polymerized NBR and emulsion-polymerized EPDM). Emulsion-polymerized NBR is commercially available in general. Therefore, from a viewpoint of availability, emulsion-polymerized NBR is preferred. On the other hand, emulsion-polymerized EPDM and solution-polymerized EPDM are both commercially available. Here, the solution-polymerized EPDM is expensive as the scale of distribution thereof is still small. Therefore, from a viewpoint of availability, the emulsion-polymerized EPDM is preferred. Note that the rubber components of the disclosed hose rubber composition may consist only of NBR and EPDM, or may further contain other rubber components.

The ratio of NBR in the rubber components, though not particularly limited, is generally preferably 30 to 75 mass %, more preferably 40 to 75 mass %, and furthermore preferably 45 to 70 mass %, from a viewpoint of oil resistance in the case where NBR is used for an outer cover rubber of a hydraulic hose. The NBR ratio of 30 mass % or more prevents the average acrylonitrile content (AN content) in the rubber composition from becoming excessively small, which thus provides sufficient oil resistance. Further, the NBR ratio of 75 mass % or less secures a compoundable EPDM amount, to thereby provide sufficient weather resistance.

Any publicly-known NBR may be appropriately selected and used as the NBR with no particular limitation, where the acrylonitrile content (AN content) in NBR is preferably 26 mass % or less, more preferably 15 to 26 mass %, and furthermore preferably 20 to 26 mass %. The AN content in NBR of 26 mass % or less provides high compatibility with EPDM and sufficient rubber characteristics. Further, the AN content therein of 15 mass % or more provides sufficient oil resistance.

On the other hand, the ratio of EPDM in the rubber components is not particularly limited, either. However, in the case where EPDM is used for an outer cover rubber of a hydraulic hose, the EPDM ratio is generally preferably 25 to 50 mass %, more preferably 30 to 40 mass %, and furthermore preferably 30 to 35 mass %, from a viewpoint of weather resistance. The EPDM ratio of 25 mass % or more provides sufficient weather resistance. Further, the EPDM ratio of 50 mass % or less sufficiently secures a compoundable NBR amount, to thereby provide well-balanced oil resistance and weather resistance.

The hose rubber composition of the present disclosure is not particularly limited but may further contain other rubber components in addition to the above-mentioned NBR and EPDM as rubber components. As the other rubber components, a diene-based rubber excluding EPDM is preferred. In particular, from a viewpoint of improving compatibility with NBR and EPDM and improving wear resistance of the rubber composition to be obtained, styrene-butadiene rubber (SBR) and butadiene rubber (BR) are preferred. In the case where SBR or BR is blended into the disclosed hose rubber composition, the ratio of SBR or BR in the rubber components is preferably in the range of 0.1 to 45 mass %, and more preferably in the range of 20 to 35 mass %.

Further, examples of the diene-based rubber excluding the above-mentioned SBR and BR include: publicly-known natural rubber (NR); synthetic rubber such as isoprene rubber (IR), butyl rubber (IIR), or epoxidized natural rubber; and further include natural rubber or synthetic rubber having modified molecular chain ends. Further examples of the rubber components excluding the diene-based rubber include polysulfide rubber, silicone rubber, fluorine rubber, and urethane rubber. In the case of using these rubber components, each may be contained in the rubber components preferably by 10 mass % or less.

The disclosed hose rubber composition further contains a cobalt salt of an organic acid. The hose rubber composition containing a cobalt salt of an organic acid has improved adhesiveness to wires to be used for reinforcement of the hose, particularly brass-plated wires, and further to cords formed by twisting such wires. Here, the wire material is preferably metal.

The cobalt salt of an organic acid is not particularly limited, and examples thereof include cobalt naphthenate, cobalt stearate, cobalt versatate, and borides of these cobalt salts of organic acids. Among these, from a viewpoint of adhesiveness to wires, cobalt versatate is preferred. One kind of cobalt salt of an organic acid may be used alone, or two or more kinds thereof may be used in combination.

Preferably, 1 to 5 parts by mass, and more preferably, 2 to 4 parts by mass of the cobalt salt of an organic acid may be contained with respect to 100 parts by mass of the rubber components. The content of the cobalt salt of an organic acid of 1 part by mass or more improves adhesiveness to wires, and the content thereof of 5 parts by mass or less prevents excessive tackiness of the rubber composition and provides favorable processability for the rubber composition.

The disclosed hose rubber composition further contains hydrotalcite. As described above, the hydrotalcite adsorbs moisture, and the hydrotalcite adsorbs an emulsifier deriving from rubber components as raw materials if present.

In general, the hydrotalcite is a kind of clay mineral produced in nature but may also be synthesized. In the present disclosure, a natural product or a synthetic product may both be used. For example, hydrotalcite is preferably a double hydroxide represented by the following general formula (1):

$$M^1{}_{8-x}M^2{}_x(OH)_{16}CO_2 \cdot nH_2O \qquad (1)$$

In the formula (1): $M^1$ represents $Mg^{2+}$, $Fe^{2+}$, $Zn^{2+}$, $Ca^{2+}$, $Ni^{2+}$, $Co^{2+}$, $Cu^{2+}$, or the like; $M^2$ represents $Al^{3+}$, $Fe^{3+}$, $Mn^{3+}$, or the like; and $2 \leq x \leq 5$, $n \geq 0$.

Specific examples of the hydrotalcite include $Mg_{4.5}Al_2(OH)_{13}CO_3 \cdot 3.5H_2O$, $Mg_{4.5}Al_2(OH)_{13}CO_3$, $Mg_4Al_2(OH)_{12}CO_3 \cdot 3.5H_2O$, $Mg_6Al_2(OH)_{16}CO_3 \cdot 4H_2O$, $Mg_5Al_2(OH)_{14}CO_3 \cdot 4H_2O$, $Mg_3Al_2(OH)_{10}CO_3 \cdot 1.7H_2O$, $Mg_3ZnAl_2(OH)_{12}CO_3 \cdot wH_2O$ (w is a number of 0 or more), and $Mg_3ZnAl_2(OH)_{12}CO_3$. Examples of commercially-available hydrous hydrotalcite include "DHT-4A" and "DHT-6" available from Kyowa Chemical Industry Co., Ltd.

The content of the hydrotalcite is in the range of 0.5 to 5 parts by mass, and preferably 0.5 to 3 parts by mass with respect to 100 parts by mass of the rubber components. The hydrotalcite content of less than 0.5 parts by mass with respect to 100 parts by mass of the rubber components provides low ability of absorbing moisture or an emulsifier and may deteriorate adhesiveness. On the other hand, the hydrotalcite content of more than 5 parts by mass may affect rubber characteristics.

The disclosed hose rubber composition may contain various compounding agents in addition to the rubber components, the cobalt salt of an organic acid, and hydrotalcite. Examples of the compounding agent include: a crosslinking agent (vulcanizing agent) such as sulfur; a vulcanization accelerator; a reinforcing filler; an antioxidant; a plasticizer; waxes; a softener; a lubricant; an ultraviolet absorbing agent; a dispersant; a compatibilizing agent; a homogenizing agent; steric acid; and zinc oxide.

The crosslinking agent (vulcanizing agent) is preferably sulfur, and the content thereof is generally 0.5 to 3.5 parts by mass, preferably 1 to 3.5 parts by mass, with respect to 100 parts by mass of the rubber components.

Further, the disclosed hose rubber composition may further contain a basic inorganic oxide such as magnesium oxide or calcium oxide. Here, preferably 4 parts by mass or less of the basic inorganic oxide is contained with respect to 100 parts by mass of the rubber components. The content of the basic inorganic oxide being 4 parts by mass or less with respect to 100 parts by mass of the rubber component can sufficiently suppress influence on the rubber characteristics.

The disclosed hose rubber composition can be obtained, for example, by kneading the above-mentioned components using a mixer such as an open-type mixing knead roller, an internal-type Banbury mixer, or a kneader.

<Hydraulic Hose>

The disclosed hydraulic hose employs the above-mentioned hose rubber composition. In the disclosed hydraulic hose, the above-mentioned hose rubber composition may be used for various parts of the hydraulic hose but is preferably used for an outer surface rubber layer (outer cover rubber) of the hydraulic hose. The disclosed hydraulic hose employs the hose rubber composition having improved adhesiveness to wires while maintaining the above-mentioned rubber characteristics. Thus, the disclosed hydraulic hose has high adhesiveness between the rubber composition and wires generally used in hydraulic hoses, and is also high in durability as it maintains the rubber characteristics of the parts employing the rubber composition.

For example, a hydraulic hose 1 according one embodiment of the present disclosure employing the above-mentioned hose rubber composition for an outer surface rubber layer (outer cover rubber) includes, as illustrated in FIG. 1: an inner surface rubber layer (inner tube layer) 2; a reinforcement layer 3 positioned on the radially outer side of the inner surface rubber layer 2; and an outer surface rubber layer (outer cover rubber) 4 positioned on the radially outer side of the reinforcement layer 3.

For manufacture of the hydraulic hose, the following method may be illustrated.

First, outside a core body (mandrel) having substantially the same diameter as the inner diameter of a hose, a rubber composition for an inner surface rubber layer (inner tube rubber) is extruded to coat the mandrel, to thereby form the inner surface rubber layer (inner tube rubber) 2 (inner tube extruding step). Next, outside the inner surface rubber layer 2 formed in the inner tube extruding step, a predetermined number of brass-plated wires are knitted to laminate the reinforcement layer 3 (knitting step), and outside the reinforcement layer 3, the disclosed hose rubber composition is extruded, to thereby form the outer surface rubber layer (outer cover rubber) 4 (outer cover extruding step). Further, as required, outside of the outer surface rubber layer 4 formed in the outer cover extruding step is coated with a resin (resin mold coating step), and the resultant is vulcanized under general conditions (vulcanizing step). After vulcanization, the above-mentioned coated resin is peeled off (resin mold peeling step), and the mandrel is removed (mandrel moving step), to thereby provide the hydraulic hose 1 having the reinforcement layer 3 formed between the inner surface rubber layer 2 and the outer surface rubber layer 4.

The hydraulic hose 1 may be structured as: a three-layer structure including the inner surface rubber layer 2, the reinforcement layer 3, and the outer surface rubber layer 4 sequentially laminated from the inside; or a five-layer structure including two reinforcement layers having an intermediate rubber layer (intermediate rubber) between the two reinforcement layers for further imparting strength and the like, although not illustrated. These structures may be appropriately defined in accordance with the prescribed properties and the like of the hose. Further, the reinforcement layers do not have to be all formed of brass-plated wires, and a reinforcing layer partially formed of organic fibers may also be used.

EXAMPLES

INDUSTRIAL APPLICABILITY

The disclosed hose rubber composition may be used in various parts of the hose, and in particular, may preferably be used for an outer surface rubber layer (outer cover rubber) of a hydraulic hose. Further, the disclosed hydraulic hose may be used for various machines operating by hydraulics such as industrial machines and construction machines.

REFERENCE SIGNS LIST 1 hydraulic hose
2 inner surface rubber layer (inner tube rubber)
3 reinforcement layer
4 outer surface rubber layer (outer cover rubber)

The invention claimed is:

1. A hose rubber composition, comprising:
   acrylonitrile-butadiene rubber (NBR) and ethylene-propylene-diene rubber (EPDM), as rubber components; and
   a cobalt salt of an organic acid and hydrotalcite,
   wherein the cobalt salt of an organic acid is cobalt versatate,
   wherein 0.5 to 5 parts by mass of the hydrotalcite is contained with respect to 100 parts by mass of the rubber components.

2. The hose rubber composition according to claim 1, wherein 1 to 5 parts by mass of the cobalt salt of an organic acid is contained with respect to 100 parts by mass of the rubber components.

3. The hose rubber composition according to claim 1, wherein a mass ratio (NBR/EPDM) of the acrylonitrile-butadiene rubber (NBR) to the ethylene-propylene-diene rubber (EPDM) is 55/45 to 75/25.

4. A hydraulic hose comprising the hose rubber composition according to claim 1.

5. The hose rubber composition according to claim 2, wherein the cobalt salt of an organic acid comprises cobalt versatate.

6. The hose rubber composition according to claim 2, wherein a mass ratio (NBR/EPDM) of the acrylonitrile-butadiene rubber (NBR) to the ethylene-propylene-diene rubber (EPDM) is 55/45 to 75/25.

7. A hydraulic hose comprising the hose rubber composition according to claim 2.

8. The hose rubber composition according to claim 1, wherein a mass ratio (NBR/EPDM) of the acrylonitrile-butadiene rubber (NBR) to the ethylene-propylene-diene rubber (EPDM) is 55/45 to 75/25.

9. A hydraulic hose comprising the hose rubber composition according to claim 1.

10. A hydraulic hose comprising the hose rubber composition according to claim 3.

11. The hose rubber composition according to claim 5, wherein a mass ratio (NBR/EPDM) of the acrylonitrile-butadiene rubber (NBR) to the ethylene-propylene-diene rubber (EPDM) is 55/45 to 75/25.

12. A hydraulic hose comprising the hose rubber composition according to claim 5.

13. A hydraulic hose comprising the hose rubber composition according to claim 6.

14. A hydraulic hose comprising the hose rubber composition according to claim 8.

15. A hydraulic hose comprising the hose rubber composition according to claim 11.

* * * * *